(12) United States Patent
Yoon

(10) Patent No.: US 10,195,795 B2
(45) Date of Patent: Feb. 5, 2019

(54) APPARATUS FOR BONDING RELEASE FILM FOR SEPARATING ARTIFICIAL STONE FROM RUBBER MOLD

(71) Applicant: JSTEC CO., LTD., Cheongju-si, Chungcheongbuk-do (KR)

(72) Inventor: Jung Sik Yoon, Cheongju-si (KR)

(73) Assignee: JSTEC CO., LTD., Cheongju-si, Chungcheongbuk-do (KR)

( * ) Notice: Subject to any disclaimer, the term of this patent is extended or adjusted under 35 U.S.C. 154(b) by 371 days.

(21) Appl. No.: 15/286,868

(22) Filed: Oct. 6, 2016

(65) Prior Publication Data

US 2017/0021574 A1   Jan. 26, 2017

(30) Foreign Application Priority Data

Aug. 31, 2016   (KR) .................. 10-2016-0111787

(51) Int. Cl.
*B29C 69/00*   (2006.01)
*B29C 33/68*   (2006.01)
*B28B 7/36*   (2006.01)

(52) U.S. Cl.
CPC ............ *B29C 69/001* (2013.01); *B28B 7/364* (2013.01); *B29C 33/68* (2013.01)

(58) Field of Classification Search
CPC ......... B29C 69/001; B29C 33/68; B28B 7/36; B28B 7/362; B28B 7/364; B28B 7/366
See application file for complete search history.

(56) References Cited

U.S. PATENT DOCUMENTS

2007/0216064 A1*  9/2007  Logan ................... B28B 7/12
                                                    264/299
2013/0216761 A1*  8/2013  Sadler ................. B28B 1/082
                                                    428/69

FOREIGN PATENT DOCUMENTS

| KR | 20-0395060 Y1 | 9/2005 |
|---|---|---|
| KR | 10-2007-0041337 A | 4/2007 |
| KR | 10-0812642 B1 | 3/2008 |
| KR | 10-1096565 B1 | 12/2011 |
| KR | 10-1308503 B1 | 9/2013 |
| KR | 10-1581962 B1 | 12/2015 |

* cited by examiner

*Primary Examiner* — Philip C Tucker
*Assistant Examiner* — John Blades
(74) *Attorney, Agent, or Firm* — Rabin & Berdo, P.C.

(57) ABSTRACT

Disclosed is an apparatus for bonding a release film for separating an artificial stone from a rubber mold and, more particularly, to an apparatus for bonding a release film for separating an artificial stone from a rubber mold that allows for easy separation of a mold for manufacturing an artificial stone and an artificial stone manufactured in the mold without applying a release agent.

4 Claims, 13 Drawing Sheets

APPARATUS FOR BONDING RELEASE FILM FOR SEPARATING ARTIFICIAL STONE FROM RUBBER MOLD

BACKGROUND OF THE INVENTION

Field of the Invention

The present invention relates to an apparatus for bonding a release film for separating an artificial stone from a rubber mold and, more particularly, to an apparatus for bonding a release film for separating an artificial stone from a rubber mold that allows for easy separation of a mold for manufacturing an artificial stone and an artificial stone manufactured in the mold without applying a release agent.

Description of the Related Art

An artificial stone, which is a limitation of a natural stone, is a building material in that various stone dusts and stone engravings are putted on a surface of a mortar or a concrete. The artificial stone is manufactured and completed in such a manner that the broken pieces of granite or the granite having beautiful colors are moderately mixed, it is kneaded with water and putted into a mold to be cured, and then the surface thereof is trimmed. Accordingly, since the broken pieces or the stone dusts etc. are utilized, it is very economic. Also, it is more efficient owing to the machining of the curved surface thereof.

The artificial stone is mainly used as the material of a wall or a floor. However, it is polished and then, is utilized in the stairs or the window frame etc. Also, a terrazzo is widely used as an advanced material for polishing of the artificial stone. The technologies for manufacturing these artificial stones are disclosed in "Patent Literature 1" through "Patent Literature 5".

The Patent Literature 1 relates to a mold for producing artificial stone molding for decoration of a building. In order to produce the artificial stone having a beautiful decoration and a durability, it is provided to a mold for producing artificial stone molding for decoration of the building including a mold body formed in the shape of a box having one opened side and provided with a cavity formed inside to form the artificial stone molding; a press plate assembled to the opened side of the mold body and formed with an area smaller than the opened sectional area of the mold body; and a combining unit assembled and fixed to the mold body to prevent separation of the press plate.

The Patent Literature 2 relates to a manufacturing method of an artificial stone and a manufacturing device thereof. The manufacturing method of the artificial stone includes the following steps: (a) mixing more than two kinds of chips with different diameters with a raw material of the artificial stone; (b) inserting the raw material to a mold; (c) applying a first vibration using a vibrating device to uniformly disperse the raw material inside the mold; (d) vacuuming to remove bubbles from the raw material; and (e) molding the artificial stone by applying a second vibration. According to the method and device for manufacturing artificial stone, the deposition rate of chips exposed at a surface of artificial stone is maximized, and thus the external appearance of artificial stone can be more naturally expressed and resistance against abrasion and staining can be improved.

The Patent Literature 3 relates to a method and a system for treating the surface of stone materials. It is provided to improve productivity by automatically implementing a surface treating process and a surface washing process using one line; further form assembled inner walls so as to prevent a wall of a shoot chamber from being broken by means of shoot balls applied from an impeller; and simply and quickly replace a part or all of the walls. The method for treating the surface of stone materials includes: (S10) a transferring step of continuously supplying and transferring stone materials (S) to the inside of a main body (1); (S20) a pre-treating step of sucking impurities from the surface of the stone materials and scattering materials from the lower side of the main body; (S30) a shooting step of applying the shoot balls from the impeller to the surfaces of the stone materials; (S40) a post-treating step of blowing the impurities from the surfaces of the stone materials and sucking the scattering impurities; and (S50) a washing step of removing the impurities from the surfaces of the stone materials by washing them using a rotating brush and sucking the scattering impurities. The system for treating the surface of the stone materials includes a final treating chamber (60) having a second blower (61) for blowing the brushed the impurities from the surfaces of the stone materials and a fourth inlet (62) for sucking the scattering impurities.

The Patent Literature 4 relates to an artificial stone manufacturing device. The object thereof is provided to an artificial stone manufacturing device capable of consecutively and automatically mass-producing artificial stone and easily manufacturing artificial stone having the feeling of various natural stone by changing the concrete pigments of a mixture for artificial stone. Also, the artificial stone manufacturing device includes multiple artificial stone molding frames having one end seated on an upper surface of a conveying part fixed to a floor surface at regular intervals and circulated and moved along the conveying part by driving the conveying part and one surface having a cross section corresponded to the shape of the artificial stone so as to form the artificial stone; multiple mixture feed ports for artificial stone formed on an outside of the conveying part so as to stir the mixtures for artificial stone mixed with different concrete pigments and supply them to the inside of artificial stone molding frames transferred along the conveying part respectively; a wet mortar feed port formed on the front of the multiple mixture feed ports for artificial stone in order to supply wet mortar to the artificial stone molding frame in which a mixture for artificial stone is stored in the inside thereof; a palette feed port formed on the front of the wet mortar feed port in order to supply palettes which cover an upper side of the transferred artificial stone molding frame; a pressurized oscillation part formed on the front of the palette feed port in order to mix a mixture for artificial stone which is supplied to the artificial stone molding frame by pressurizing the palettes which cover the upper side of the transferred artificial stone molding frame while generating a vibration to a bottom side of the artificial stone molding frame; and a rotation demolding part formed on the front of the pressurized oscillation part in order to de-mold the mixture for artificial stone and wet mortar from the artificial stone molding frame after the artificial stone molding frame transferred through a transport unit is rotated 180 degrees.

The Patent Literature 5 relates to an artificial stone manufacturing apparatus capable of manufacturing various kinds of artificial stones having various shapes by using one mold. The artificial stone manufacturing apparatus includes: side and lower plates having a plurality of tap holes; a mold having a plurality of shape deformation bolts coupled to the tap holes in order that the protrusion length thereof can be adjusted inside the tap holes; and a rubber molded body inserted and fixed to the inside of the mold through a fixing means and having a filling space for filling the concrete or the concrete having the pigments therein.

In manufacturing method of this artificial stone, a portland cement or a white cement is pasted with the water, stone dusts and stone engravings of the granite or the marble are added thereto, and then, it is molded in a plate shape by using a red clay or a red oxide as the pigment. At this time, in case of the machining methods of the surface thereof, there are various methods such as a washing via a surface treatment after painting (it is wiped with the brush more than two times, the location of the stone is adjusted, and then, it sprays the clean water with a pump in consideration of the curing status to be wiped), a polishing (the surface of the mortar is gradually and smoothly polished with a whetstone according to the hardening status of the mortar. Also, after the finishing touch of the whetstone, it can be polished by using a wax etc.), and a beating (it strains broken-stone chips through a sieve of 6 mm, it applies things of coming out of the sieve to a surface to a thickness of about 9 mm, it is fully hardened, and then, it is beaten through the chisel to be polished). The above artificial stone manufacturing processes are essential.

However, in case of the process of smoothing the surface thereof, it can take a long time to perform the work according to the manufacturing status of the artificial stone. That is, it depends on the state of the surface of the manufactured artificial stone. During manufacturing of the artificial stone, where a releasing agent is not evenly applied on the mold, the surface state of the artificial stone is not good when the cured artificial stone is separated from the mold. Also, in case of the manufacturing process of the artificial stone using the releasing agent, it causes many problems.

It will be examined closely according to the manufacturing process of the artificial stone.

In the conventional manufacturing process of the artificial stone, it prepares the rubber mold including a lower plate having a projection portion formed on a circumference thereof and an upper plate for covering and pressing the upper portion of the projection portion of the lower plate, the crushed natural stones are mixed with a PVC, the mixed mixture of the natural stone is formed on the lower plate, a vibration is applied to the lower plate through a vibrator so as to densely process the particles of the mixture of the natural stones and the PVC, the lower plate is covered with the upper plate, it is pressed through a compressor so as to cure the artificial stone, and then finally, the surface of the artificial stone is smoothly polished after the cured artificial stone is separated from the mold, so that it completes the artificial stone.

At this time, in the conventional art, in order to separate the artificial stone from the rubber mold, before the mixture of the natural stone and the PVC is formed on the rubber mold, the releasing agent is applied to the upper plate and the lower plate.

However, in case of the manufacturing of the artificial stone using the above conventional method and the techniques of the Patent literatures 1 through 5, a spray equipment for applying the releasing agent to the rubber mold is additionally required. Also, where the artificial stone is separated from the rubber mold in a state that the releasing agent is not perfectly applied to the rubber mold, since the remains of the mixture of the natural stone and the PVC are bonded to the mold, the life of the mold is shortened and it requires additional labors so as to clean it. Also, where the cleaning work is not perfectly performed, the manufacturing equipment can be broken.

In addition, a PVA, which is a main component of the releasing agent is a matter that causes an environmental pollution. Accordingly, in the conventional art, the PVA was recycled by using a distillation. However, since the cost of equipment for distillation is very expensive, it increases the financial burden owing to the use of the distillation.

Moreover, after the application of the releasing agent, it requires a drying equipment for drying the applied releasing agent. Accordingly, there is a problem in that it can incur additional purchasing cost of equipment for manufacturing the artificial stone.

PATENT LITERATURE

Patent Literature 1: Korean Patent Registration No. 10-0812642 (Mar. 5, 2008)
Patent Literature 2: Korean Patent Registration No. 10-1581962 (Dec. 24, 2015)
Patent Literature 3: Korean Patent Registration No. 10-1096565 (Dec. 14, 2011)
Patent Literature 4: Korean Patent Registration No. 10-1308503 (Sep. 9, 2013)
Patent Literature 5: Korean Utility Model Registration No. 20-0395060 (Sep. 1, 2005)

SUMMARY OF THE INVENTION

The present invention has been made in an effort to solve the problems in the related art and an object of the present invention is to provide an apparatus for bonding a release film for separating an artificial stone from a rubber mold that allows for easy separation of a mold for manufacturing an artificial stone and an artificial stone manufactured in the mold without applying a release agent.

Another object of the present invention is to provide an apparatus for bonding a release film for separating an artificial stone from a rubber mold that can remarkably increase the lifespan of a mold for manufacturing an artificial stone.

Further another object of the present invention is to provide an apparatus for bonding a release film for separating an artificial stone from a rubber mold that can bond a release film to a mold for manufacturing an artificial stone up to the edges of the mold without wrinkles.

Further another object of the present invention is to provide an apparatus for bonding a release film for separating an artificial stone from a rubber mold that can prevent an uneven surface of an artificial stone due to wrinkles of a release film bonded to a mold for manufacturing an artificial stone.

According to an aspect of the invention to achieve the object described above, there is provided an apparatus for bonding a release film for separating artificial stone from rubber mold, including:

a body (100) that includes at least one or more driving motors;

a conveyor (200) that is disposed on the body (100) and conveys at least any one or more of a mold (M) and a release film (F) using power from the driving motor to a target position in the conveyance direction;

a driving frame (300) that includes: a middle frame (310) that is disposed over a target position in a conveyance direction of the conveyor (200) to be vertically movable and is seated on the center of the top of the mold (M) conveyed to the target position in the conveyance direction of the conveyor (200) when moving downward; a four-directional moving frame (320) including lateral moving frames (320A) that are composed of bars coupled to the left and right sides of the middle frame (310) and are horizontally reciprocated left and right with the left and right sides of the middle frame (310), and longitudinal moving frames (320B) that are composed of bars coupled to the front and rear sides of the middle frame (310) and are horizontally reciprocated back and forth with the front and rear sides of the middle frame (310); and an edge frame (330) that extends outward from the middle frame (310) to be vertically movable and is seated on the edge of the top of the mold (M) conveyed to the target position in the conveyance direction of the conveyor (200) when moving downward; and a suction-feeding roll (400) that includes: a plurality of suction grooves (430) formed by boring the feeding roll so that a release film (F) unrolled from an unwinding roll is adsorbed to the feeding roll when being conveyed; and one or more blade guide grooves (420) formed in the longitudinal direction of the feeding roll so that a blade (510) can be inserted therein and can cut the release film (F) on the feeding roll.

Preferably, the body (100) further includes a punching roller (700) having a plurality of punching pins (710) around the outer side to form a plurality of holes through a release film (F) that is being conveyed.

Preferably, the edge frame (330) includes a vacuum pump connector (336) for connecting a vacuum pump at any one of a side or the upper portion to evacuate the edge frame (330).

Preferably, the edge frame (330) further includes release film holders (370) to be able to pick up like tweezers the edges of the release film (F).

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, the present invention can be variously changed and have various forms and the specific implementation examples in accordance with this invention are exemplified and explained in detail in reference to the drawings. However, since the present invention is limited by the specific embodiments, it should be understood that the scope of the invention includes all of the changes, the equivalents, and the substitutes for realizing the technical concept. Also, since the specific embodiments do not include all objects and effects presented by the present invention, the scope of the present invention is not limited by them. The detailed description about the prior related technology will also be omitted when it is judged to blur the gist of this invention in explaining this invention.

Even though the terms such as 1, 2, and others can be used to explain many components, the above components shall not be limited by the above terms. The above terms are used only to distinguish one component from the other component. For example, the first component can be named as the second component without departing from the scope of rights in this invention. Similarly, the second component can be named as the first component.

The terms used in this application do not intend to limit this invention, but are used only to explain specific implementation examples. The singular expression includes plural expressions unless it is apparently different in the context.

The terms such as "include", "equipped" or "have" in this application intend to designate that the feature, number, stage, movement, component, part or the combination described in the specification exist. Therefore, it will be understood that the existence or the additional possibility of one or more than one different features, numbers, stages, actions, components, parts and the combination is not excluded in advance.

Hereinafter, a preferred embodiment of the invention will be described in detail with reference to the accompanying drawings.

Figure 1:
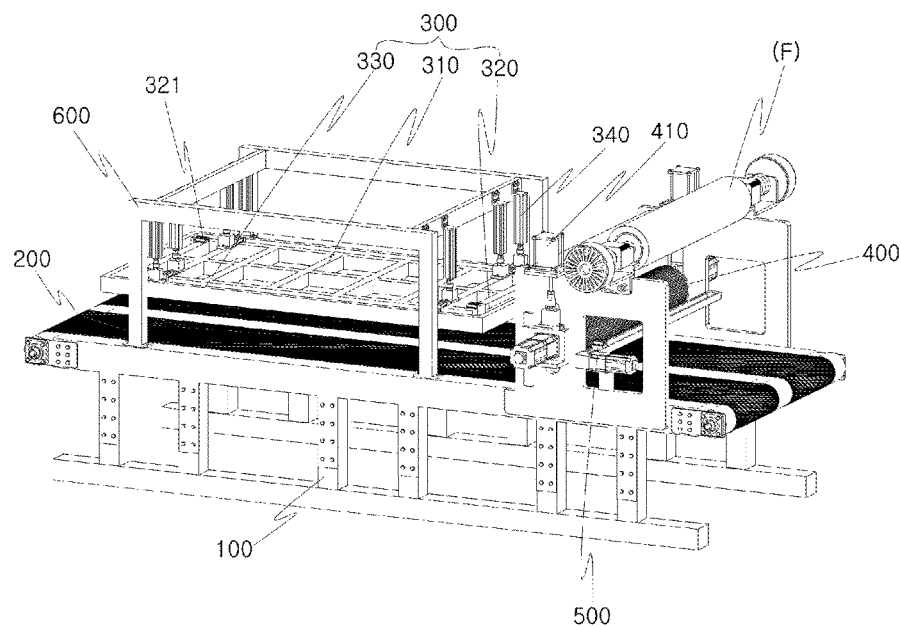
FIG. 1 is a perspective view of the present invention.
Figure 5:
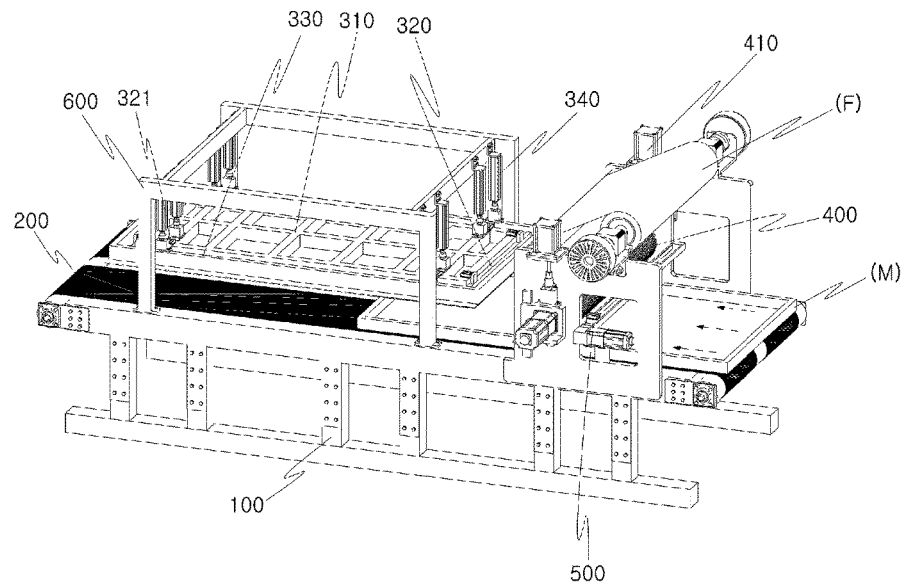
Figure 6:
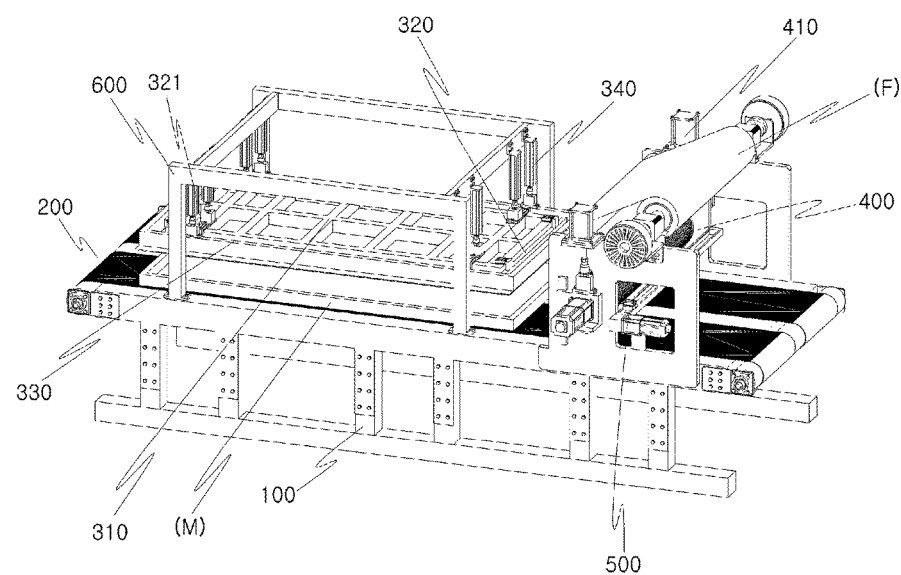
Figure 7:
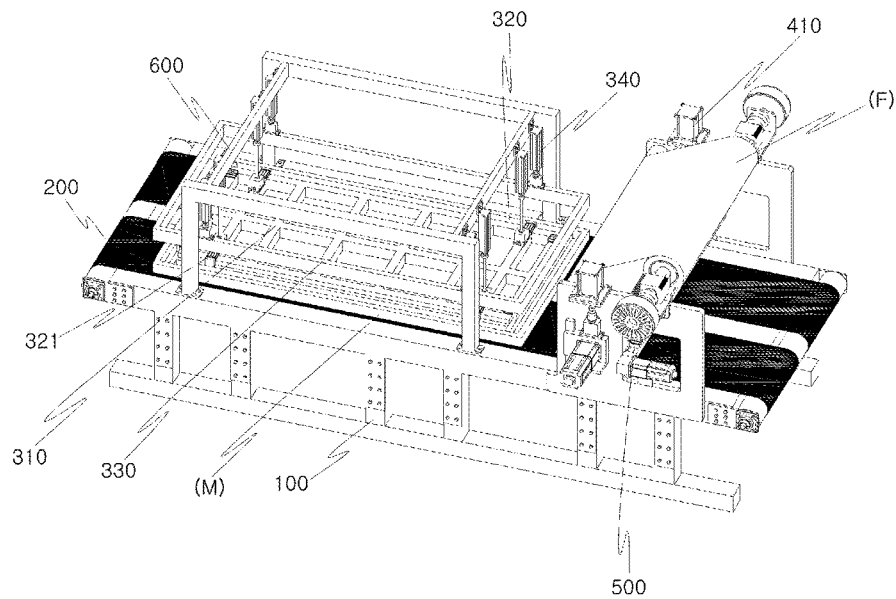
Figure 8:
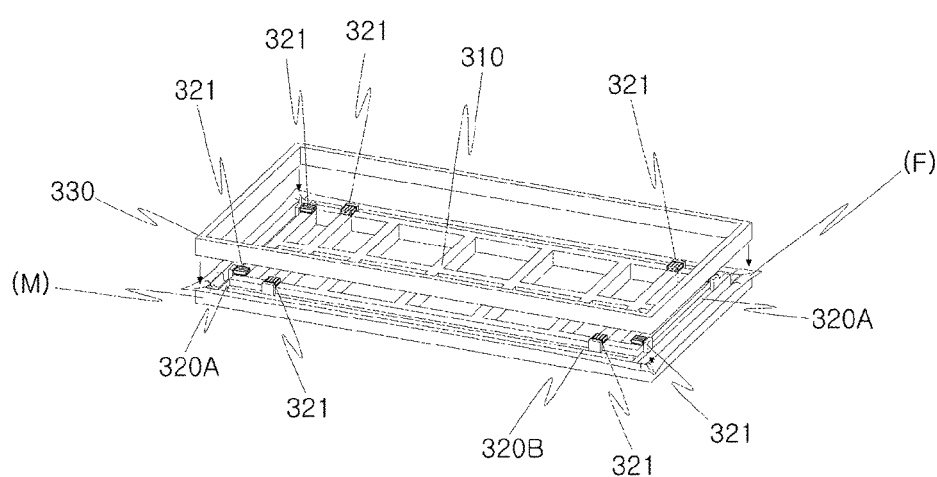
FIG. 8 is a partial perspective view showing operation of a driving frame shown in FIG. 7.
Figure 9:
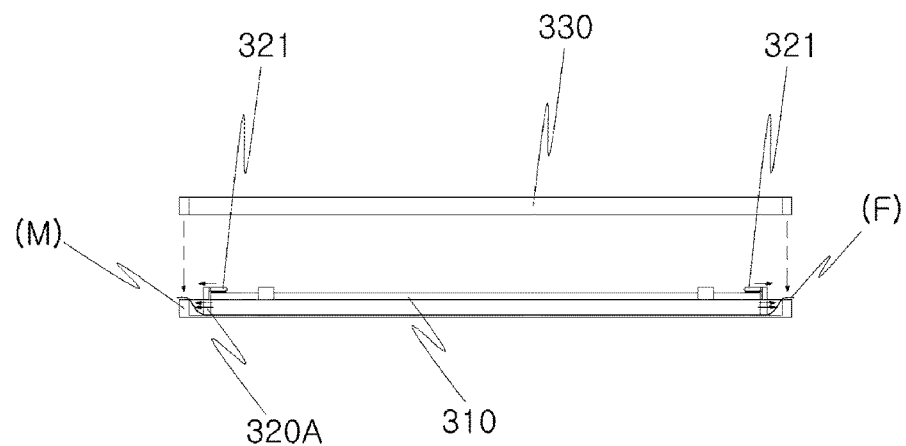
FIG. 9 is a front view showing operation of the driving frame shown in FIG. 7.
Figure 10:
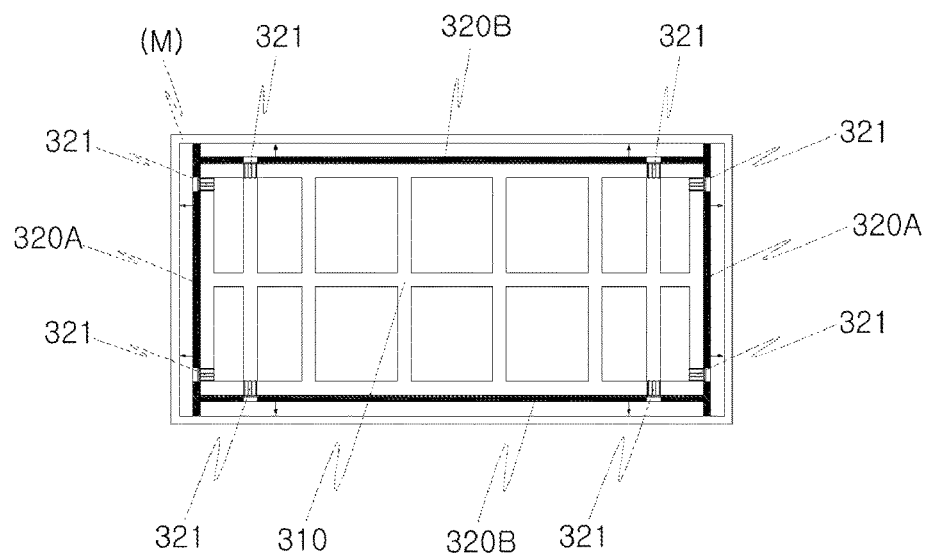
FIG. 10 is a perspective view showing a middle frame of the present invention moved down with a release film and seated on a plan inside a mold.
Figure 11:
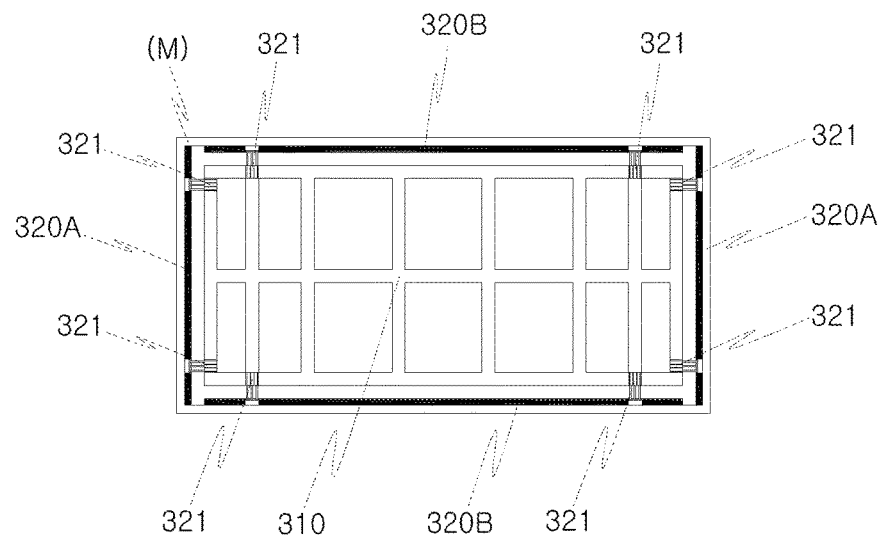
FIG. 11 is a plan view showing a four-directional frame being in contact with inner sides of the mold after the middle frame of the present invention is moved down with the release film and seated on the plane inside the mold.
Figure 12:
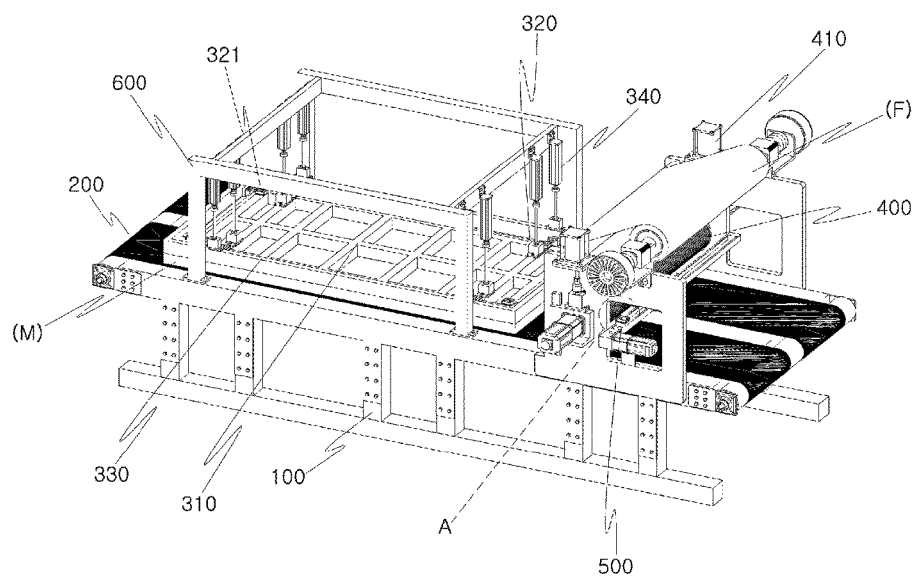
FIG. 12 is a perspective view showing an edge frame of the present invention moved down and seated on the edges of the mold after the four-directional frame of the present invention is operated.
Figure 13:
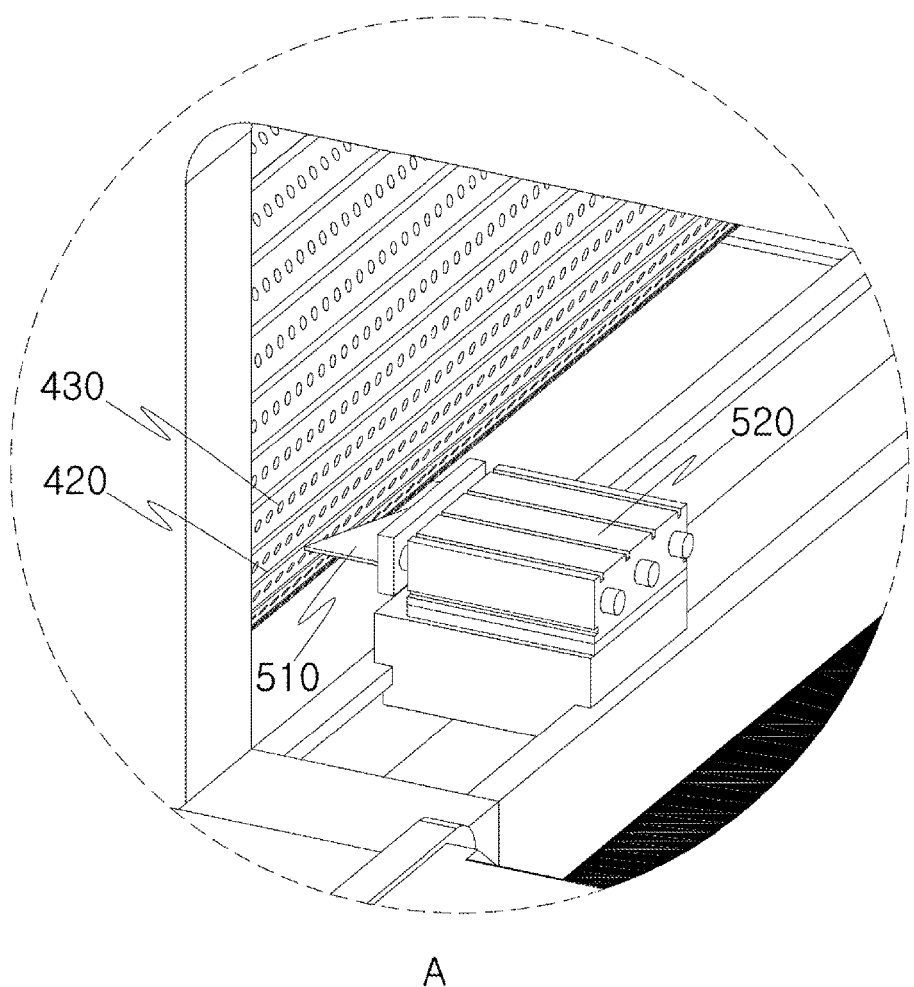
FIG. 13 is a partial enlarged view of the portion A shown in FIG. 12.

FIG. 1 is a perspective view of the present invention, FIGS. 2 to 7 are views showing operation of the present invention, FIG. 8 is a partial perspective view showing operation of a driving frame, FIG. 9 is a front view showing operation of the driving frame shown in FIG. 7, FIG. 10 is a partial perspective view showing a middle frame of the present invention moved down with a release film and seated on a plan inside a mold, FIG. 11 is a plan view showing a four-directional moving frame being in contact with inner sides of the mold after the middle frame of the present invention is moved down with the release film and seated on the plan inside the mold, FIG. 12 is a perspective view showing an edge frame of the present invention moved down and seated on the edges of the mold after the four-directional moving frame of the present invention is operated, and FIG. 13 is a partial enlarged view of the portion A shown in FIG. 12.

Referring to FIG. 1, an embodiment of the present invention largely includes a body (100), a conveyor (200), a driving frame (300), and a suction-feeding roll (400).

In detail, an apparatus for bonding a film includes:

a body (100) that includes at least one or more driving motors;

a conveyor (200) that is disposed on the body (100) and conveys at least any one or more of a mold (M) and a release film (F) using power from the driving motor to a target position in the conveyance direction;

a driving frame (300) that includes: a middle frame (310) that is disposed over a target position in a conveyance direction of the conveyor (200) to be vertically movable and is seated on the center of the top of the mold (M) conveyed to the target position in the conveyance direction of the conveyor (200) when moving downward; a four-directional moving frame (320) including lateral moving frames (320A) that are composed of bars coupled to the left and right sides of the middle frame (310) and are horizontally reciprocated left and right with the left and right sides of the middle frame (310), and longitudinal moving frames (320B) that are composed of bars coupled to the front and rear sides of the middle frame (310) and are horizontally moved back and forth with the front and rear sides of the middle frame (310); and an edge frame (330) that extends outward from the middle frame (310) to be vertically movable and is seated on the edge of the top of the mold (M) conveyed to the target position in the conveyance direction of the conveyor (200) when moving downward; and a suction-feeding roll (400) that has: a plurality of suction grooves (430) formed by boring the feeding roll so that a release film (F) unrolled from an unwinding roll is adsorbed to the feeding roll when being conveyed; and one or more blade guide grooves (420) formed in the longitudinal direction of the feeding roll so that a blade (510) can be inserted therein and can cut the release film (F) on the feeding roll.

The body (100) includes one or more driving motor.

The conveyor (200) is disposed on the body (100) and conveys at least any one or more of a mold (M) and a release film (F) using power from the driving motor to a target position in the conveyance direction.

The target position means a position where the release film (F) is bonded to the mold (M), over a conveyor belt and under the driving frame (300) at the end in the conveyance direction of the conveyor (200).

Figure 14:
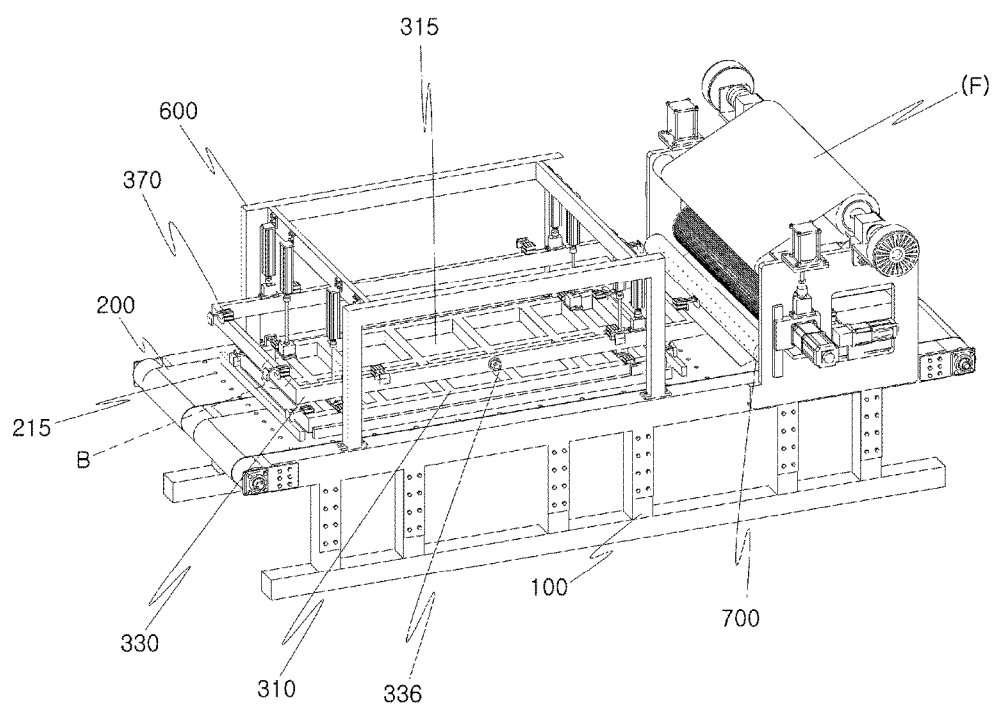
FIG. 14 is a perspective view illustrating a constructional example of the present invention.

The conveyor (200) may have a plurality of film-holding holes (215) formed through the conveyor belt of the conveyor (200), as shown in FIG. 14, to be able to fix the release film (F) to the conveyor (200) when conveying the release film (F).

The driving frame (300) includes the middle frame (310), the four-directional moving frame (320), and the edge frame (330), and the four-directional moving frame (320) includes the lateral moving frames (320A) and the longitudinal moving frames (320B).

The middle frame (310) is disposed over a target position in the conveyance direction of the conveyor (200) to be vertically movable and is seated on the center of the top of the mold (M) conveyed to the target position in the conveyance direction of the conveyor (200) when moving downward.

Figure 18:
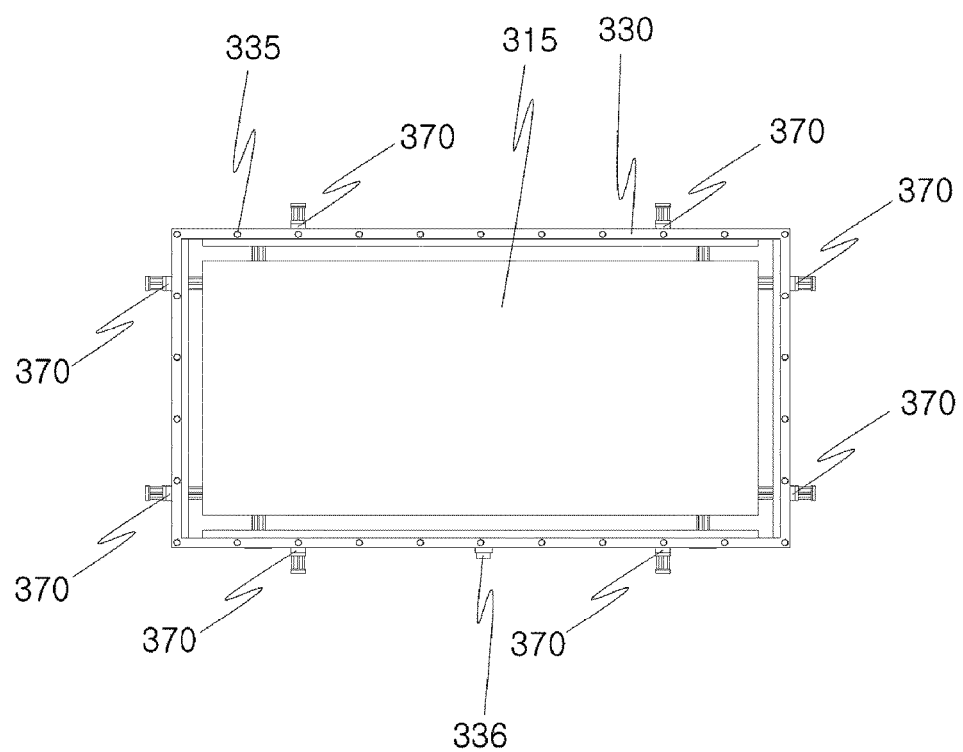
FIG. 18 is a bottom view illustrating a driving frame 300 according to the present invention.
Figure 19:
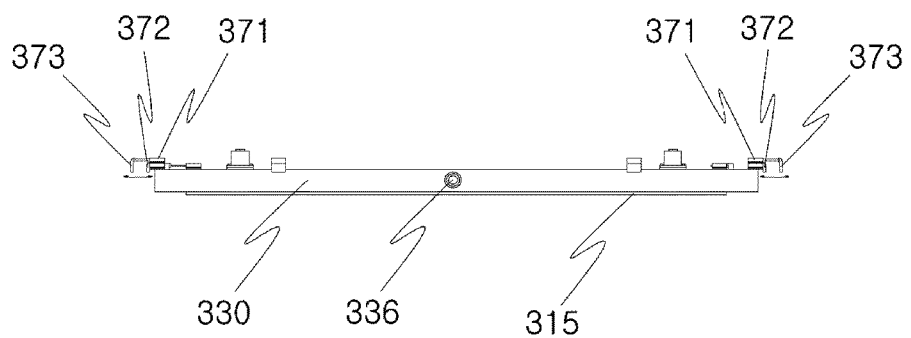
FIG. 19 is a front view illustrating a driving frame 300 according to the present invention.
Figure 20:
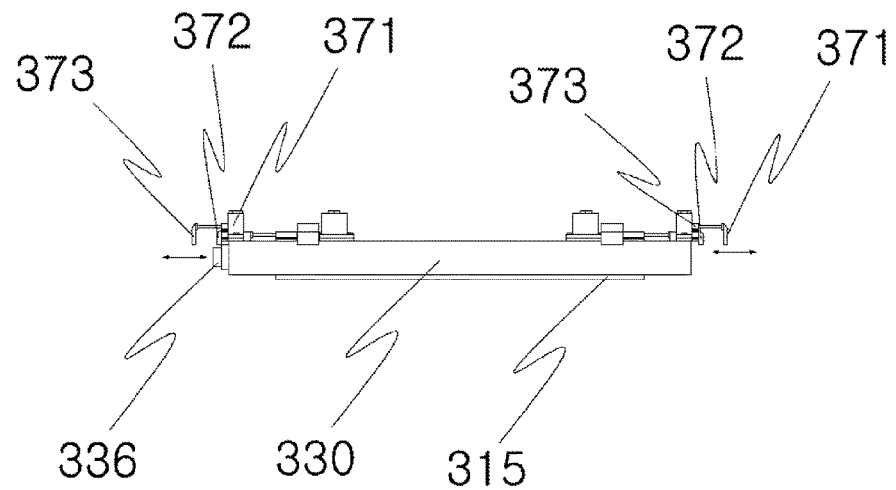
FIG. 20 is a right side view illustrating a driving frame 300 according to the present invention.

Referring to FIGS. 18 to 20, the middle frame (310) may include a film-pressing plate (315) that is coupled to the bottom of the middle frame (310) in order to bond a release film (F), which is disposed between the middle frame (310) and the mold (M) when the middle frame (310) is moved to the plan inside the mold (M), to the plan inside the mold (M) without wrinkles.

The lateral moving frames (320A) are bars coupled to the left and right sides of the middle frame (310) and are horizontally reciprocated left and right with the left and right sides of the middle frame (310).

The longitudinal moving frames (320B) are bars coupled to the front and rear sides of the middle frame (310) and are horizontally reciprocated back and forth with the front and rear sides of the middle frame (310).

The edge frame (330) extends outward from the middle frame (310) to be vertically movable and is seated on the edge of the top of the mold (M) conveyed to the target position in the conveyance direction of the conveyor (200) when moving downward.

Referring to FIGS. 14 and 17 to 20, the edge frame (330) may include a vacuum pump connector (336) for connecting a vacuum pump at any one of a side or the upper portion to evacuate the edge frame (330).

Referring to FIG. 18, the edge frame (330) may have a plurality of film-adsorbing holes (335) formed through the bottom to adsorb a release film (F) when the edge frame 330 moves down and the release film (F) conveyed by the conveyor (200) is brought in contact with the bottom of the edge frame (330).

The suction-feeding roll (400), which is a feeding roll, includes the suction grooves (430) and the blade guide grooves (420).

The suction grooves (430) are formed through the feeding roll so that a release film (F) can be adsorbed to the feeding roll when the release film (F) is unrolled and conveyed from the unwinding roll.

The blade guide grooves (420) are formed in the longitudinal direction of the feeding roll so that the blade (510) can be inserted therein and cut a release film (F) on the feeding roll.

The present invention according to this configuration largely includes a body (100), a conveyor (200), a driving frame (300), a suction-feeding roll (400), a film cutter (500), and a cylinder frame (600).

In detail, an apparatus for bonding a film includes:

a body (100) that includes at least one or more driving motors;

a conveyor (200) that is disposed on the body (100) and conveys at least any one or more of a mold (M) and a release film (F) using power from the driving motor to a target position in the conveyance direction;

a cylinder frame (600) that is disposed over a side of the body and a target position in a conveyance direction of the conveyor to couple a plurality of vertical moving cylinders (340) over the conveyor (200);

a driving frame (300) that includes: the vertical moving cylinders (340) that have an upper portion coupled to the cylinder frame (600) perpendicular to the ground and reciprocate perpendicular to the ground; a middle frame (310) that is disposed over a target position in a conveyance direction of the conveyor (200) to be vertically movable with the vertical moving cylinders (340) and is seated on the center of the top of the mold (M) conveyed to the target position in the conveyance direction of the conveyor (200) when moving downward; a four-directional moving frame (320) including lateral moving frames (320A) that are composed of bars coupled to the left and right sides of the middle frame (310) and are coupled to the middle frame (310) through four-directional moving cylinders (321) to be horizontally reciprocated left and right with the left and right sides of the middle frame (310), and longitudinal moving frames (320B) that are composed of bars coupled to the front and rear sides of the middle frame (310) and are coupled to the middle frame (310) through the four-directional moving cylinders (321) to be horizontally reciprocated back and forth with the front and rear sides of the middle frame (310); and an edge frame (330) that extends outward from the middle frame (310) to be vertically movable with the vertical moving cylinders (340) and is seated on the edge of the top of the mold (M) conveyed to the target position in the conveyance direction of the conveyor (200) when moving downward;

a suction-feeding roll (400) that has: a plurality of suction grooves (430) formed by boring the feeding roll so that a release film (F) unrolled from an unwinding roll is adsorbed to the feeding roll when being conveyed; one or more blade guide grooves (420) formed in the longitudinal direction of the feeding roll so that a blade (510) can be inserted therein and can cut the release film (F) on the feeding roll; and suction-feeding roll vertical moving cylinders (410) at both sides to adjust the height; and a film cutter (500) that includes: a blade (510) that can cut a release film (F); and a moving blade cylinder (520) that has the blade (510) on a side such that the blade faces the suction-feeding roll (400) and reciprocates with respect to the suction-feeding roll (400) in order to insert the blade (510) into the blade guide grooves (420) of the suction-feeding roll (400) to cut a release film (F) that is being conveyed or take out the blade (510) from the blade guide grooves 420 after the release film (F) is cut.

Figure 15:
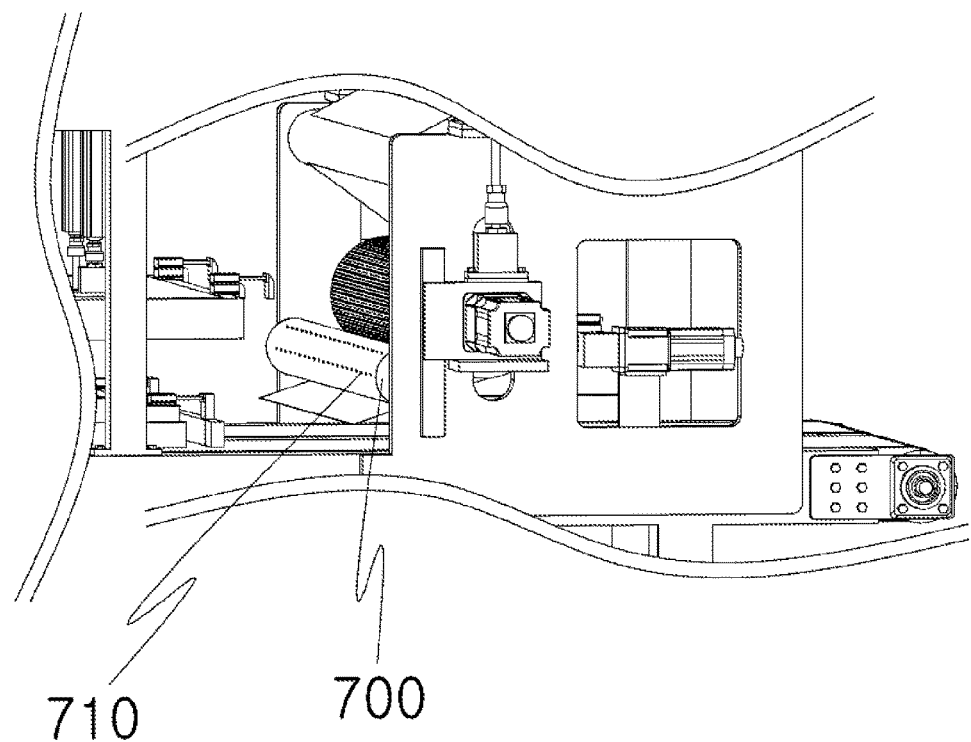
FIG. 15 is a partial enlarged view illustrating a punching roller 700 according to the present invention.
Figure 16:
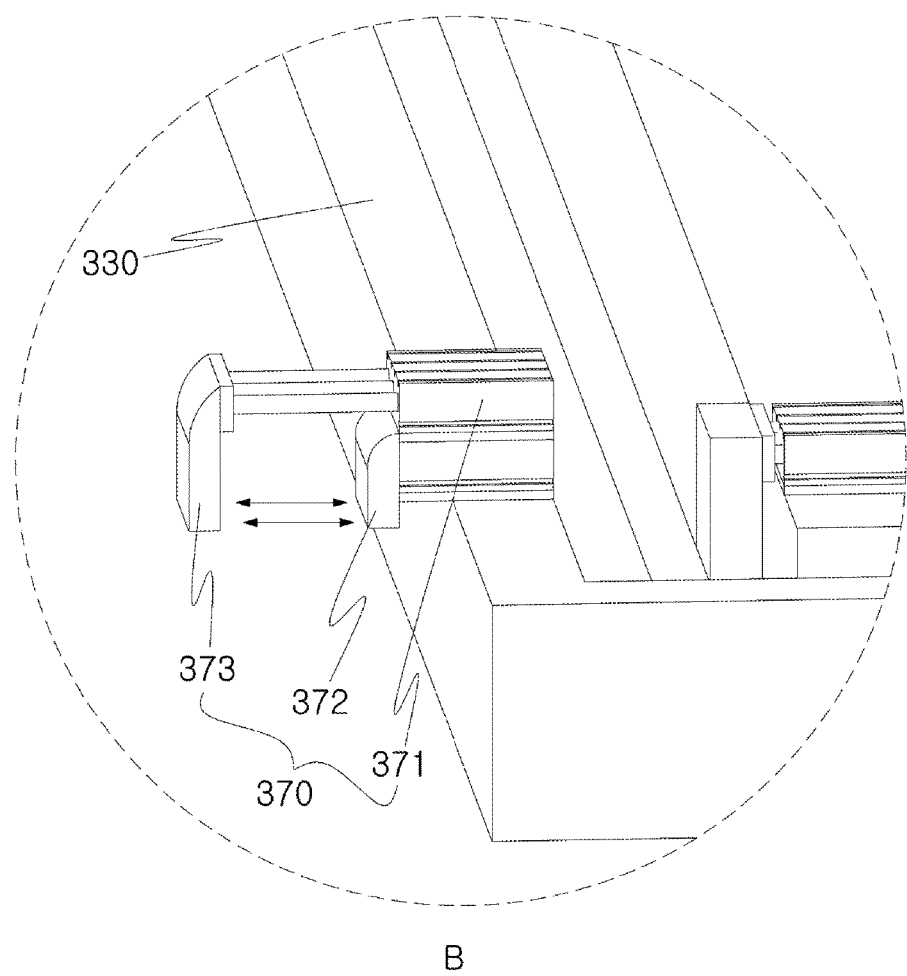
FIG. 16 is a partial enlarged view of the portion B shown in FIG. 14.
Figure 17:
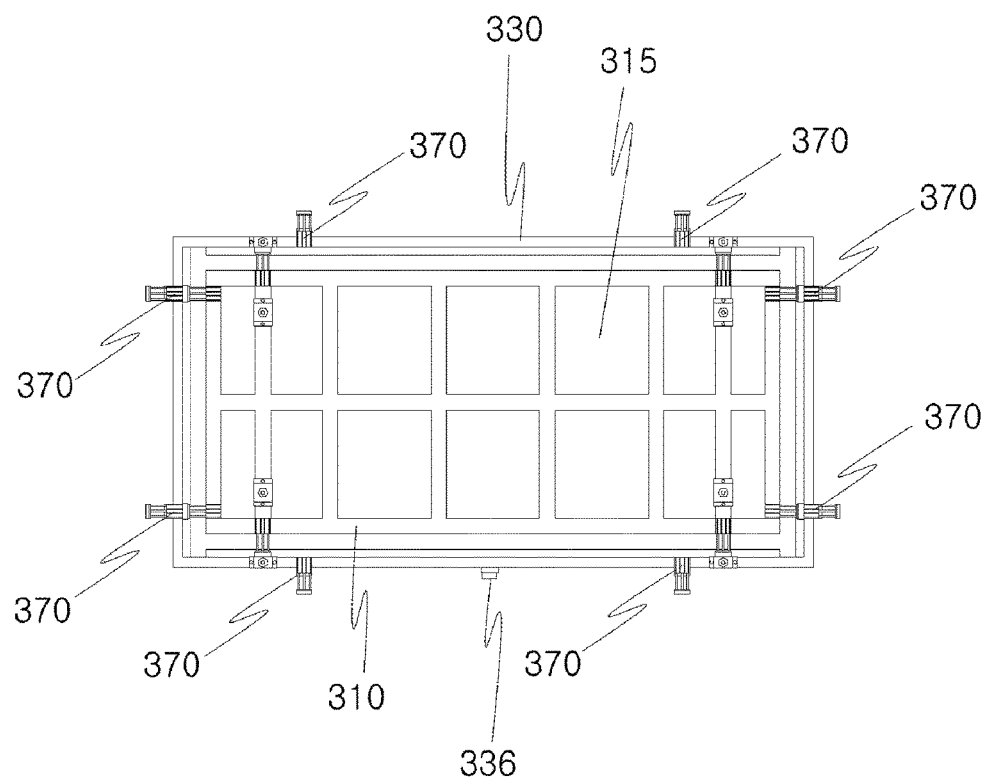
FIG. 17 is a planar view illustrating a driving frame 300 according to the present invention.

The present invention according to a second embodiment, as shown in FIGS. 14 and 15, may further include a punching roller (700) having a plurality of punching pins (710) around the outer side to form a plurality of holes through a release film (F) that is being conveyed.

The body (100) includes at least one or more driving motor.

The conveyor (200) is disposed on the body (100) and conveys at least any one or more of a mold (M) and a release film (F) using power from the driving motor to a target position in the conveyance direction.

The target position means a position where the release film (F) is bonded to the mold (M), over a conveyor belt and under the driving frame (300) at the end in the conveyance direction of the conveyor (200).

The conveyor (200) may have a plurality of film-holding holes (215) formed through the conveyor belt of the conveyor (200), as shown in FIG. 14, to be able to fix the release film (F) to the conveyor (200) when conveying the release film (F).

The film-holding holes (215) function as adsorbing holes by sucking air from above or as spray holes for blowing air upward on the conveyor (200). To this end, they may be connected to at least any one of a vacuum tank and an air compressor, or may be connected both of a vacuum pump and an air compressor to selectively suck or blow air.

The cylinder frame (600) is disposed over a side of the body and a target position in a conveyance direction of the conveyor to couple the vertical moving cylinders (340) over the conveyor (200).

Referring to FIGS. 8 to 11, the driving frame (300) includes the middle frame (310), the four-directional moving frame (320), the edge frame (330), and the vertical moving cylinders (340), and the four-directional moving frame (320) includes the lateral moving frames (320A) and the longitudinal moving frames (320B).

The vertical moving cylinders (340) each have an upper portion coupled to the cylinder frame (600) perpendicular to the ground and reciprocate perpendicular to the ground.

That is, the vertical moving cylinders (340) are coupled to the cylinder frame (600) to reciprocate perpendicular to the ground and at least any one of the middle frame (310) and the edge frame (330) is coupled to the lower portions of the vertical moving cylinders (340) coupled to the cylinder frame (600). Preferably, the middle frame (310) and the edge frame (330) may be coupled to the vertical moving cylinders (340) so that the middle frame (310) and the edge frame (330) can separately move up and down.

The middle frame (310) is disposed over a target position in the conveyance direction of the conveyor (200) to be vertically movable with the vertical moving cylinders (340) and is seated on the center of the top of the mold (M) conveyed to the target position in the conveyance direction of the conveyor (200) when moving downward.

The center of the top of the mold (M) may be the bottom inside the mold, that is, the bottom inside a space that can be filled with stone powder.

Referring to FIGS. 18 to 20, the middle frame (310) may include a film-pressing plate (315) that is coupled to the bottom of the middle frame (310) in order to bond a release film (F), which is disposed between the middle frame (310) and the mold (M) when the middle frame (310) is moved to the plan inside the mold (M), to the plan inside the mold (M) without wrinkles.

The lateral moving frames (320A) are bars coupled to the left and right sides of the middle frame (310) and are coupled to the middle frame (310) through the four-directional moving cylinders (321) to be horizontally reciprocated left and right with the left and right sides of the middle frame (310).

That is, the four-directional moving cylinders (321) are coupled to both sides of the middle frame (310) and the lateral moving frames (320A) are coupled to the sides along which the four-directional moving cylinders (321) reciprocate.

The longitudinal moving frames (320B) are bars coupled to the front and rear sides of the middle frame (310) and are coupled to the middle frame (310) through the four-directional moving cylinders (321) to be horizontally reciprocated back and forth with the front and rear sides of the middle frame (310).

That is, the four-directional moving cylinders (321) are coupled to the front and rear sides of the middle frame (310) and the longitudinal moving frames (320B) are coupled to the sides along which the four-directional moving cylinders (321) reciprocate.

The edge frame (330) extends outward from the middle frame (310) to be vertically movable with the vertical moving cylinders (340) and is seated on the edge of the top of the mold (M) conveyed to the target position in the conveyance direction of the conveyor (200) when moving downward.

Referring to FIGS. 14 and 17 to 20, the edge frame (330) may include a vacuum pump connector (336) for connecting a vacuum pump at any one of a side or the upper portion to evacuate the edge frame (330).

Referring to FIG. 18, the edge frame (330) may have a plurality of film-adsorbing holes (335) formed through the bottom to adsorb a release film (F) when the edge frame (330) moves down and the release film (F) conveyed by the conveyor (200) is brought in contact with the bottom of the edge frame (330).

Further, the edge frame (330) may further have release film holders (370), as shown in FIG. 14, to be able to pick up like tweezers the edges of the release film (F) conveyed by the conveyor (200).

The release film holder (370), as shown in FIGS. 16 to 19, may have inner holder retainers (372) each coupled to a side of the lower portion of film-holding cylinders (371) and outer holder retainers (373) each coupled to the upper portion of the film-holding cylinders (371) and reciprocated by the film-holding cylinders (371) with a side in contact with a side of each of the inner holder retainers (372).

The release film holders (370) may be coupled to the top of the edge frame (330) to reciprocate outward around the edge frame (330).

The film-holding holes (215) may function as adsorbing holes by sucking air from above or as spray holes for blowing air upward, on the conveyor (200), so the edges of the release film (F) are floated upward by blowing air through the film-holding holes (215), whereby the release film holders (370) can pick up the edges of the release film (F) floated upward.

The suction-feeding roll (400) includes the blade guide grooves (420) and the suction grooves (430).

The suction-feeding roll vertical moving cylinders (410) may be coupled to both sides of the suction-feeding roll (400) to adjust the height of the suction-feeding roll (400).

The suction grooves (430) are formed through the feeding roll so that a release film (F) can be adsorbed to the feeding roll when the release film (F) is unrolled and conveyed from the unwinding roll.

The blade guide grooves (420) are formed in the longitudinal direction of the feeding roll so that the blade (510) can be inserted therein and cut a release film (F) on the feeding roll.

The film cutter (500) includes the blade (510) and a moving blade cylinder (520).

The blade (510) can cut the release film (F).

The moving blade cylinder (520) has a blade (510) on a side such that the blade faces the suction-feeding roll (400) and reciprocates with respect to the suction-feeding roll (400) in order to insert the blade (510) into the blade guide grooves (420) of the suction-feeding roll (400) to cut a release film (F) that is being conveyed or take out the blade (510) from the blade guide grooves (420) after the release film (F) is cut.

The film cutter (500) can move in the longitudinal direction of the suction-feeding roll (400).

Figure 2:
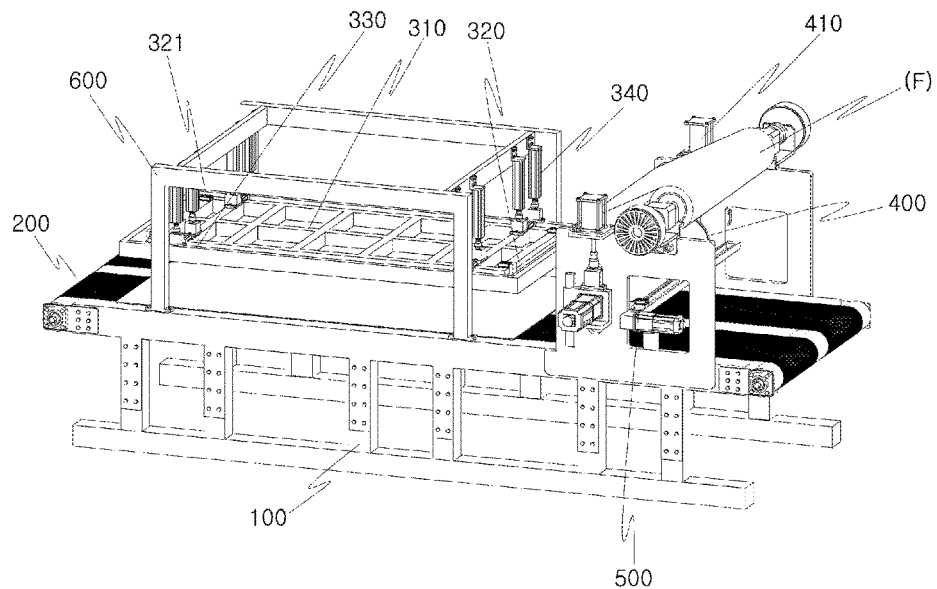
FIG. 2 to FIG. 7 are views showing operation of the present invention.

Accordingly, referring to FIG. 2, the release film (F) unrolled from the unwinding roll is adsorbed to the suction-feeding roll (400) and conveyed with rotation to the conveyor belt of the conveyor (200) and the conveyed release film (F) is moved to a side through the conveyor. When the release film (F) moves the length of the mold (M), as shown in FIG. 13, the moving blade cylinder (520) protrudes and the blade (510) coupled to the moving blade cylinder (520) is inserted into a blade guide groove (420) of the suction-feeding roll (400) and scratches the release film (F) conveyed and adsorbed to the suction-feeding roll (400). Thereafter, the film cutter (500) moves in the longitudinal direction of the suction-feeding roll (400), so that the release film (F) can be cut.

Figure 3:
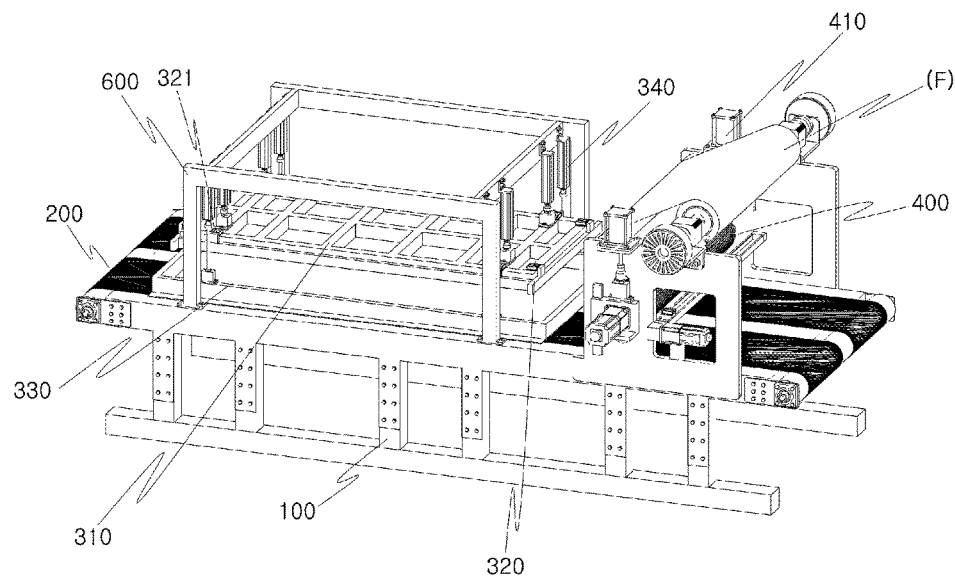
Figure 4:
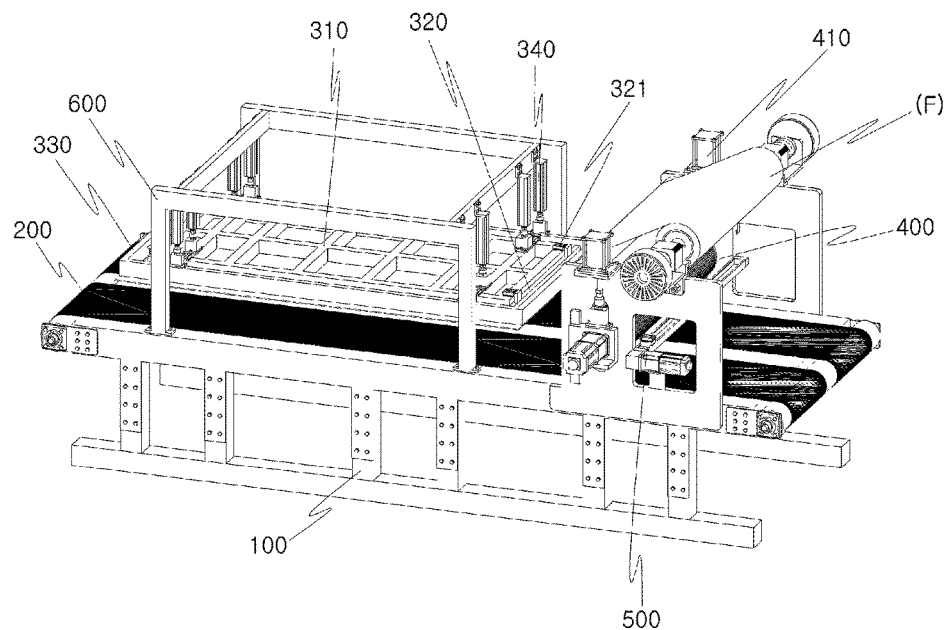

Thereafter, as shown in FIG. 2, when the release film (F) cut in the process described above is conveyed to a target position by the conveyor (200), as shown in FIG. 3, the vertical moving cylinder (340) coupled to the edge frame (330) among the vertical moving cylinders (340) coupled to the cylinder frame (600) is moved down to move down the edge frame (330). When the bottom of the edge frame (330) moved down comes in contact with the top of the release film (F) at the target position, the release film (F) is adsorbed to the bottom of the edge frame (330) by the film-adsorbing holes (335) formed in the bottom of the edge frame (330). Then, as shown in FIG. 4, the edge frame (330) is lifted and the release film (F) adsorbed to the bottom of the edge frame (330) is picked up with the edge frame (330) from the conveyor.

Thereafter, as shown in FIG. 5, the mold (M) is conveyed to a target position by the conveyor (200), and as shown in FIG. 6, when the mold (M) reaches the target position, as shown in FIGS. 7 and 8, the vertical moving cylinder (340) coupled to the middle frame (310) among the vertical moving cylinders (340) coupled to the cylinder frame (600) is moved down to move down the middle frame (310), whereby the center of the release film (F) picked up with the edge frame (330) is pressed. Accordingly, the release film (F) comes in contact with the center of the plan inside the mold (M), and thus the center of the release film (F) is bonded to the center of the plan inside the mold (M).

Since the release film (F) is pressed to the center of the plan inside the mold (M) by the middle frame (310), it can be firmly bonded.

In this process, the edge frame (330), as shown in FIG. 9, is maintained at the position where it has been moved up by the vertical moving cylinder (340), and then, as shown in FIGS. 10 and 11, it laterally pushes the four-directional moving frame (320) coupled to the middle frame (310) through the four-directional moving cylinders (321) such that the four-directional moving frame (320) is brought in contact with the inner sides of the mold (M), whereby the release film (M) is bonded to the inner sides of the mold (M).

Thereafter, as shown in FIG. 12, the edges of the release film (F) that are irregularly placed on the edges of the mold (M) are pressed by moving down again the edge frame (330), thereby bonding the edges of the release film (F) to the tops of the edges of the mold (M).

Accordingly, in the apparatus for bonding the release film for separating the artificial stone from the rubber mold according to the present invention, there is an effect capable of allowing for easy separation of the mold for manufacturing the artificial stone and the artificial stone manufactured in the mold without applying the release agent.

Also, there is another effect in that it provides the apparatus for bonding the release film for separating the artificial stone from the rubber mold that can remarkably increase the lifespan of the mold for manufacturing the artificial stone.

Moreover, there is further another effect in that it provides the apparatus for bonding the release film for separating the artificial stone from the rubber mold that can bond the release film to the mold for manufacturing the artificial stone up to the edges of the mold without wrinkles.

Furthermore, there is further another effect in that it provides the apparatus for bonding the release film for separating the artificial stone from the rubber mold that can prevent an uneven surface of an artificial stone due to wrinkles of a release film bonded to a mold for manufacturing an artificial stone.

While the present invention has been described with respect to the specific embodiments, it will be apparent to those skilled in the art that various changes and modifications may be made without departing from the spirit and scope of the invention as defined in the following claims.

What is claimed is:

1. An apparatus for bonding a release film for separating artificial stone from rubber mold, comprising:
   a body (100) that includes at least one or more driving motors;
   a conveyor (200) that is disposed on the body (100) and conveys at least any one or more of a mold (M) and a release film (F) using power from a driving motor to a target position in a conveyance direction;
   a driving frame (300) that comprises: a middle frame (310) that is disposed over a target position in a conveyance direction of the conveyor (200) to be vertically movable and is seated on the center of the top of the mold (M) conveyed to the target position in the conveyance direction of the conveyor (200) when moving downward; a four-directional moving frame (320) including lateral moving frames (320A) that are composed of bars coupled to left and right sides of the middle frame (310) and are horizontally reciprocated left and right with the left and right sides of the middle frame (310), and longitudinal moving frames (320B) that are composed of bars coupled to front and rear sides of the middle frame (310) and are horizontally reciprocated back and forth with the front and rear sides of the middle frame (310); and an edge frame (330) that extends outward from the middle frame (310) to be vertically movable and is seated on an edge of the top of the mold (M) conveyed to the target position in the conveyance direction of the conveyor (200) when moving downward; and a suctioned feeding roll (400) that has: a plurality of suction grooves (430) formed by boring the feeding roll so that the release film (F) unrolled from an unwinding roll is adsorbed to the feeding roll when being conveyed; and one or more blade guide grooves (420) formed in the longitudinal direction of the feeding roll so that a blade (510) can be inserted therein and can cut the release film (F) on the feeding roll.

2. The apparatus for bonding the release film as claimed in claim 1, wherein the body (100) further comprises a punching roller (700) having a plurality of punching pins (710) around the outer side to form a plurality of holes through the release film (F) that is being conveyed.

3. The apparatus for bonding the release film as claimed in claim 1, wherein the edge frame (330) comprises a vacuum pump connector (336) at any one of a side or an upper portion, for connecting a vacuum pump to evacuate the edge frame (330).

4. The apparatus for bonding the release film as claimed in claim 1, wherein the edge frame (330) further comprises release film holders (370) to be able to pick up like tweezers the edges of the release film (F).

* * * * *